US012587745B2

(12) United States Patent
Nakabayashi et al.

(10) Patent No.: US 12,587,745 B2
(45) Date of Patent: Mar. 24, 2026

(54) IMAGE CAPTURING APPARATUS AND CONTROL METHOD THEREOF

(71) Applicant: CANON KABUSHIKI KAISHA, Tokyo (JP)

(72) Inventors: Mai Nakabayashi, Tokyo (JP); Tamaki Negishi, Tokyo (JP); Toru Matsumoto, Kanagawa (JP); Shimpei Itagaki, Tokyo (JP); Naoki Nomura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 18/602,902

(22) Filed: Mar. 12, 2024

(65) Prior Publication Data

US 2024/0323531 A1 Sep. 26, 2024

(30) Foreign Application Priority Data

Mar. 20, 2023 (JP) ................................ 2023-044725

(51) Int. Cl.
*H04N 23/68* (2023.01)
*H04N 23/67* (2023.01)

(52) U.S. Cl.
CPC ......... *H04N 23/687* (2023.01); *H04N 23/672* (2023.01)

(58) Field of Classification Search
None
See application file for complete search history.

(56) References Cited

U.S. PATENT DOCUMENTS

| | | | | |
|---|---|---|---|---|
| 2011/0228053 | A1* | 9/2011 | Aoki | H04N 23/672 348/E13.074 |
| 2016/0006937 | A1* | 1/2016 | Yamamoto | H04N 23/54 348/208.11 |
| 2016/0198141 | A1* | 7/2016 | Fettig | H04N 25/709 348/46 |
| 2017/0094210 | A1* | 3/2017 | Galor Gluskin | H04N 23/672 |
| 2018/0288306 | A1* | 10/2018 | Lay | H04N 23/11 |
| 2021/0136295 | A1* | 5/2021 | Saito | H04N 23/55 |
| 2021/0144291 | A1* | 5/2021 | Akamatsu | H04N 23/67 |
| 2024/0323530 | A1* | 9/2024 | Takao | H04N 23/672 |

FOREIGN PATENT DOCUMENTS

JP 2021-071573 A 5/2021

* cited by examiner

*Primary Examiner* — Cynthia Segura
(74) *Attorney, Agent, or Firm* — Cowan, Liebowitz & Latman, P.C.

(57) ABSTRACT

An image capturing apparatus comprising: an image sensor with a plurality of pixels including focus detection pixels that output signals so as to be able to acquire a pair of focus detection signals having parallax based on light fluxes that have passed through mutually different pupil regions of an imaging optical system are arranged; a movement control unit that moves incident positions of the light fluxes on the image sensor; and a focus detection unit that performs phase difference focus detection using the pair of focus detection signals. The movement control unit periodically moves the incident positions a plurality of cycles during an exposure period for acquiring the pair of focus detection signals, and a point spread function of the movement in a the phase difference detection direction has three or more peaks or has a rectangular shape.

19 Claims, 11 Drawing Sheets

TIME $T_{AF}$ $2d_{AF}$

LIGHT INTENSITY

MOVING DIRECTION OF
INCIDENT POSITION

-c     0     c

RESPONSE

NYQUIST
FREQUENCY

SPATIAL
FREQUENCY $T_{p4}$ $F_L$     $F_H$

IMAGE CAPTURING APPARATUS AND CONTROL METHOD THEREOF

BACKGROUND OF THE INVENTION

Field of the Invention

The present invention relates to an image capturing apparatus and a control method thereof and, more specifically to, a technique for a vibration-type low-pass filter used in an image capturing apparatus.

Description of the Related Art

Conventionally, there is known a technique for alleviating spatial aliasing by arranging an optical low-pass filter on an incident surface side of an image sensor such as a CCD and a CMOS sensor.

FIG. 10 is a diagram schematically showing a spatial frequency of an image generally acquired by an image sensor and its response characteristics in a case where no optical low-pass filter is arranged. In FIG. 10, the horizontal axis represents the spatial frequency (the Nyquist frequency is 1), and the vertical axis represents its response. A solid line 901 indicates the response characteristics of the image sensor with respect to the image obtained by the image sensor. Since the response characteristic shown here also includes the MTF characteristics as optical characteristics of the imaging optical system for forming an image with light from the subject on the image sensor, the response characteristics gradually decrease toward 1 which is the sampling frequency. The MTF characteristics change depending on various optical conditions such as the focal state of the lens, the image height on the image sensor, the F value, magnification, and focus position.

When the optical low-pass filter is not arranged, the low-pass filter effect can be obtained only by the pixel aperture and the photographing optical system, and the response becomes large even at a relatively high frequency such as a frequency $F_H$. It is known from the sampling theorem that the response at the frequency $F_H$ is folded back around the Nyquist frequency of 1 and is erroneously recognized as the response at a frequency $F_L$ as shown by a solid line 902. If signals in a frequency band around the frequency $F_L$ are extracted when calculating the phase difference for focus detection, the influence of the folded-back frequency of $F_H$ may lead to an error, and erroneous detection may be caused. Therefore, conventionally, an optical low-pass filter made of birefringent material is placed in front of the image sensor so as to reduce the response characteristics at frequencies higher than the Nyquist frequency as shown by a dashed line 903, thereby components higher than the Nyquist frequency that cause moiré in images and noise during focus detection are reduced.

Further, a minimum value at which the frequency component is cut to almost zero using the low-pass filter characteristics is called a trap point ($T_{p1}$ in FIG. 10). In optical low-pass filters made of birefringent materials, the low-pass filter characteristics vary depending on the components and thickness of the birefringent material, and generally the low-pass filters are designed such that a trap point is formed at a point higher than the Nyquist frequency to prevent aliasing signals.

On the other hand, many image stabilization techniques have been proposed in which the effects of shake on image capturing apparatuses, such as digital cameras, are corrected by moving the image sensor such as a CMOS sensor and/or some optical elements of the imaging optical system in a direction perpendicular to the optical axis. In addition, a technology has been disclosed for a vibration-type low-pass filter that utilizes the mechanism for the image stabilization techniques and obtains an effect equivalent to an optical low-pass filter by moving the sensor and/or the optical elements in a predetermined manner during image shooting (Japanese Patent Laid-Open No. 2021-071573).

In order to prevent aliasing signals, it is desirable to obtain low-pass filter characteristics in which, ideally, signals below the Nyquist frequency are not cut in order to maintain resolution, while frequency components higher than the Nyquist frequency are set to zero, as shown by a dash-dot line 904 in FIG. 10. However, in a conventional optical low-pass filter made of birefringent material that has a trap point between spatial frequencies 1 and 2, the response becomes as shown by the dashed line 903 as described above, and it is difficult to make frequency components higher than the Nyquist frequency approach zero.

On the other hand, Japanese Patent Laid-Open No. 2021-071573 discloses actuation control for obtaining the effect of a low-pass filter using a vibration-type low-pass filter, but there is no description regarding specific actuation control to achieve the effect of the low-pass filter that can reduce frequency components higher than the Nyquist frequency.

SUMMARY OF THE INVENTION

The present invention has been made in consideration of the above situation, and uses an image stabilization mechanism to achieve appropriate low-pass filter characteristics.

According to the present invention, provided is an image capturing apparatus comprising: an image sensor in which a plurality of pixels including focus detection pixels that output signals so as to be able to acquire a pair of focus detection signals having parallax based on light fluxes that have passed through mutually different pupil regions of an imaging optical system are arranged; a movement control unit that moves incident positions of the light fluxes on the image sensor; and a focus detection unit that performs phase difference focus detection using the pair of focus detection signals, wherein the movement control unit periodically moves the incident positions a plurality of cycles during an exposure period for acquiring the pair of focus detection signals, and a point spread function obtained as a result of the movement in a first direction in which the phase difference is detected has three or more peaks or has a rectangular shape, and wherein the focus detection unit is implemented by one or more processors, circuitry or a combination thereof.

Further, according to the present invention, provided is a control method of an image capturing apparatus which comprises: an image sensor in which a plurality of pixels including focus detection pixels that output signals so as to be able to acquire a pair of focus detection signals having parallax to be used for phase difference focus detection based on light fluxes that have passed through mutually different pupil regions of an imaging optical system are arranged; and a movement control unit that moves incident positions of the light fluxes on the image sensor, the method comprising periodically moving the incident positions a plurality of cycles during an exposure period for acquiring the pair of focus detection signals, wherein a point spread function obtained as a result of the movement in a first direction in which the phase difference is detected has three or more peaks or has a rectangular shape.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1A:
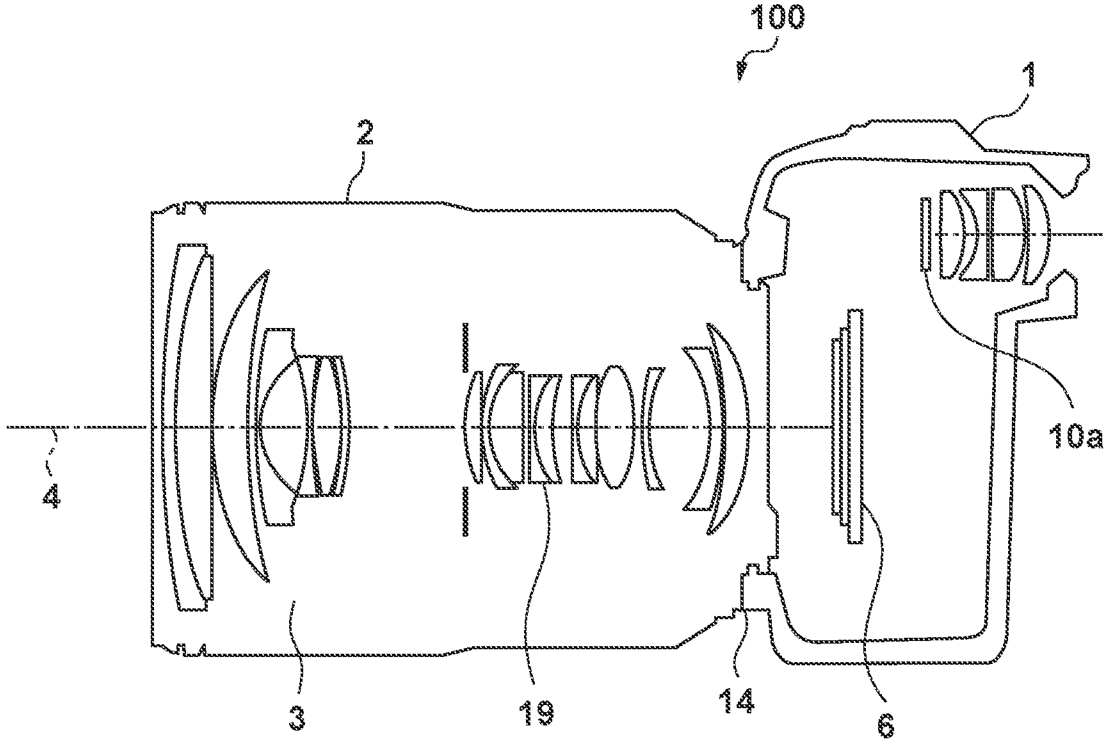
FIG. 1A is a central sectional view of an image capturing apparatus according to a first embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1B:
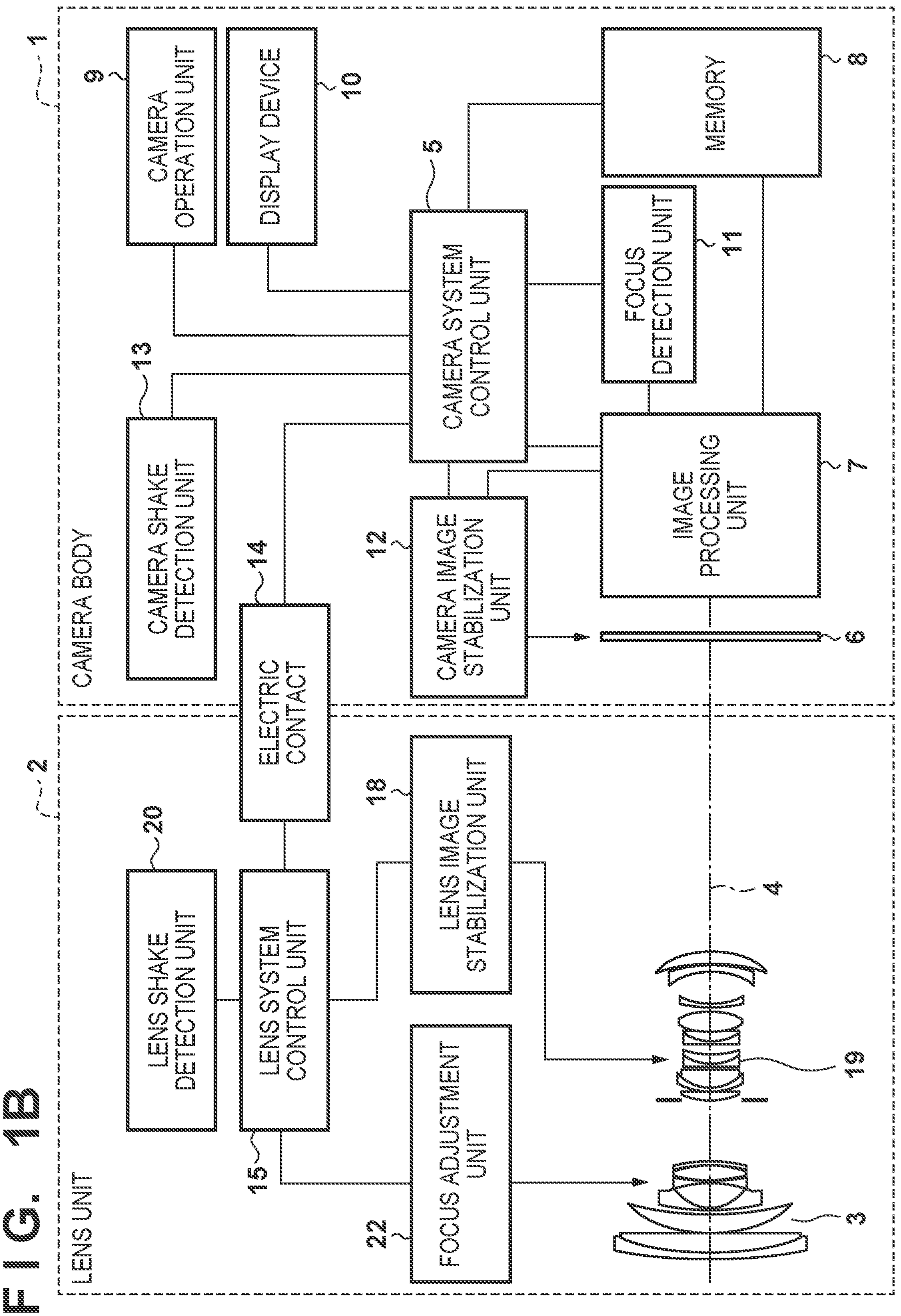
FIG. 1B is a block diagram illustrating a schematic configuration of the image capturing apparatus according to the first embodiment.

FIGS. 1A and 1B are diagrams showing a configuration of an image capturing apparatus 100 according to a first embodiment of the present invention. FIG. 1A is a central sectional view of the image capturing apparatus 100, and FIG. 1B is a block diagram showing a schematic configuration of the image capturing apparatus 100.

As shown in FIG. 1A, the image capturing apparatus 100 of the present invention includes a camera body 1 and a lens unit 2 that can be attached to and detached from the camera body 1. The lens unit 2 has an imaging optical system 3 including a plurality of lenses including an image stabilization lens unit 19. A dotted line 4 indicates the optical axis of the imaging optical system 3. The camera body 1 also includes an image sensor 6 and an electronic viewfinder 10*a* that is also called an EVF and forms a part of a display device 10. The camera body 1 and the lens unit 2 are communicably connected via an electric contact 14.

FIG. 1B is the block diagram showing the schematic configuration of the image capturing apparatus 100. The image capturing apparatus 100 composed of the camera body 1 and the lens unit 2 is roughly divided into an imaging system, an image processing system, a recording/playback system, and a control system. The imaging system includes the imaging optical system 3 and the image sensor 6, and the image processing system includes an image processing unit 7 and a focus detection unit 11. The recording/playback system includes a memory 8 and the display device 10, and the control system includes a camera system control unit 5, a camera operation unit 9, the focus detection unit 11, a lens system control unit 15, a lens image stabilization unit 18, and a focus adjustment unit 22.

In addition to the configuration shown in FIG. 1A, the lens unit 2 further includes the lens system control unit 15, the lens image stabilization unit 18 that actuates the image stabilization lens unit 19 to compensate for shake, a lens shake detection unit 20, and the focus adjustment unit 22 for actuating the focus lens included in the imaging optical system 3.

In the present embodiment, the lens shake detection unit 20 uses a vibrating gyro that uses Coriolis force, and detects the rotational shake applied to the lens unit 2. The lens shake detection unit 20 detects the shake of the lens unit 2 (referred to as "lens shake", hereinafter) caused by the shake of the user's hand and outputs the lens shake detection signal indicating the lens shake to the lens system control unit 15. The lens system control unit 15 calculates a shift amount (correction amount) of the image stabilization lens unit 19 for reducing (cancelling) the image shake due to the lens shake by using the lens shake detection signal, and outputs an image stabilization instruction including the shift amount to the lens image stabilization unit 18. The lens image stabilization unit 18 controls the movement of the image stabilization lens unit 19 based on the image stabilization instruction from the lens system control unit 15. Specifically, the image stabilization lens unit 19 is actuated by the calculated shift amount by controlling an actuator included in a shift mechanism in accordance with the image stabilization instruction, whereby lens stabilization is performed.

In addition to the image stabilization control described above, the lens system control unit 15 can also actuate a focus lens included in the imaging optical system 3 via the focus adjustment unit 22 and control to actuate an aperture mechanism (not shown), zoom lens, and so forth. In addition to image stabilization control, the lens image stabilization unit 18 also can control to actuate the image stabilization lens unit 19 based on the control of lens system control unit 15 to reduce the effects of moiré caused by aliasing of high spatial frequency components of a subject. This realizes the function as a vibration-type low-pass filter in this embodiment. Note that details of the periodic actuation control in this embodiment will be described later.

In addition to the configuration shown in FIG. 1A, the camera body 1 further includes the camera system control unit 5, the image processing unit 7, the memory 8, the camera operation unit 9, the display device 10, the focus detection unit 11, a camera image stabilization unit 12, and a camera shake detection unit 13. The display device 10 also includes a rear display device (not shown) and a small display panel (not shown) provided on the upper surface of the camera body 1 for displaying shooting information in addition to the electronic viewfinder 10*a*.

Figure 2:
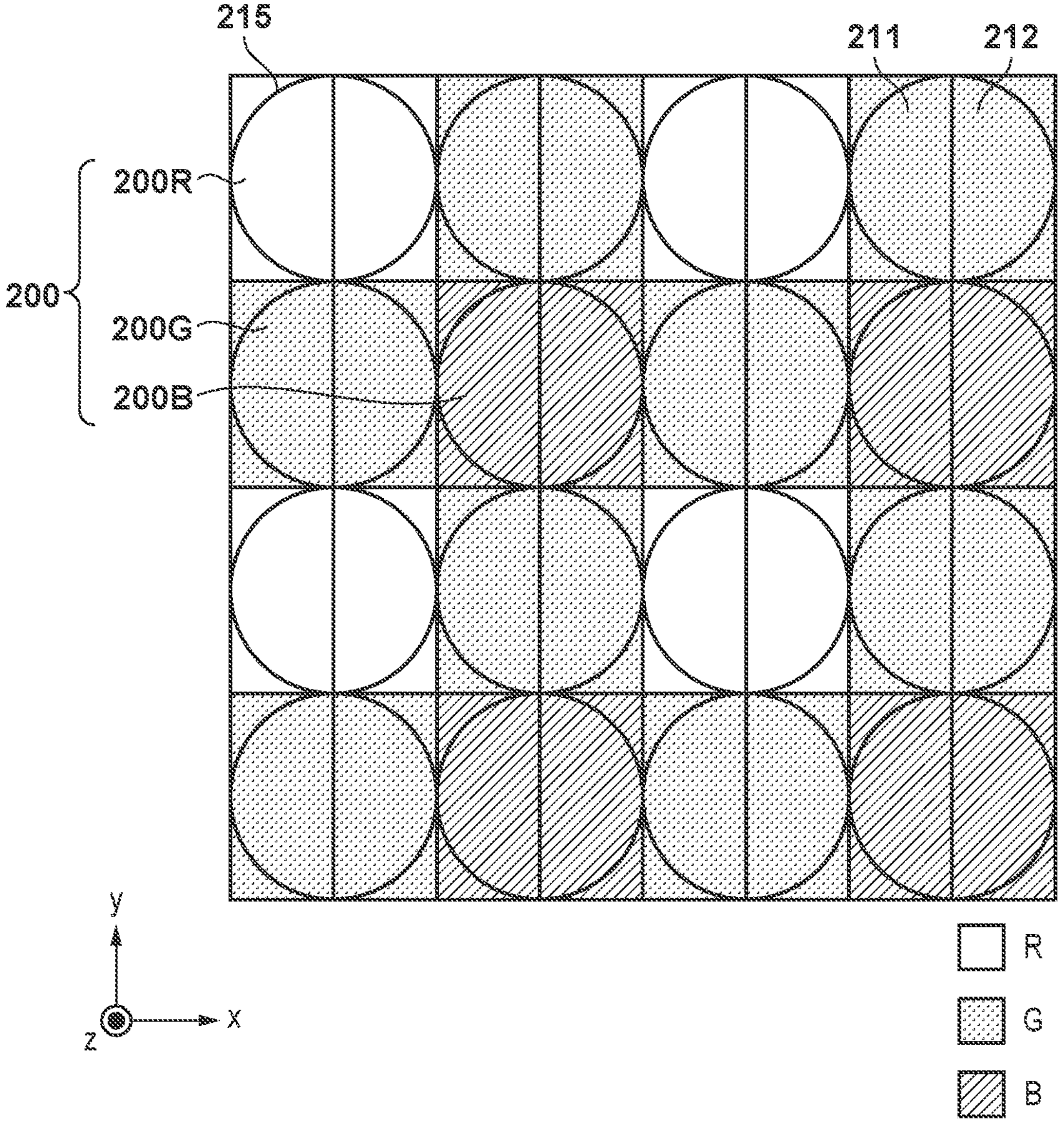
FIG. 2 is a plan view showing an example of an array of pixels according to the first embodiment.

FIG. 2 is a diagram showing an example of a pixel array of the image sensor 6 according to the present embodiment, and 4 columns×4 rows of imaging pixels in the pixel array of the two-dimensional CMOS sensor used as the image sensor 6 are shown.

In this embodiment, it is assumed that each pixel group 200 is composed of pixels of 2 columns×2 rows and is covered with the Bayer array color filter. In each pixel group 200, a pixel 200R having the spectral sensitivity of R (red) is arranged at the upper left position, pixels 200G having the spectral sensitivity of G (green) are arranged at the upper right and lower left positions, and a pixel 200B having the spectral sensitivity of B (blue) is arranged at the lower right position. Further, in the image sensor 6 of the present embodiment, each pixel has a plurality of photodiodes (photoelectric conversion units) with respect to one microlens 215 in order to perform on-imaging plane phase difference focus detection. In the present embodiment, it is assumed that each pixel is composed of two photodiodes 211 and 212 arranged in 2 columns×1 row. Hereinafter, a pixel having such a configuration is referred to as a "focus detection pixel".

The image sensor 6 can acquire an image signal and focus detection signals by arranging a large number of pixel groups 200 consisting of 2 columns×2 rows of focus detection pixels (4 columns×2 rows of photodiodes) shown in FIG. 2 on its imaging surface.

In each focus detection pixel having such a configuration, light fluxes that have passed through different pupil regions are separated by the microlens 215 and enter the photodiodes 211 and 212. Then, the signal (A+B signal) obtained by adding the signals from the two photodiodes 211 and 212 is used as an image signal, and the two signals (A signal and B signal) individually read out from the photodiodes 211 and 212 are used as a focus detection signal pair. It should be noted that the image signal and the focus detection signals may be read out respectively, but in consideration of the processing load, the following readout method may be performed. That is, the image signal (A+B signal) and the focus detection signal (for example, A signal) of one of the photodiodes 211 and 212 are read out, and the difference is taken to obtain the other focus detection signal (for example, B signal) having parallax.

Then, by collecting the plurality of A signals outputted from the plurality of pixels and the plurality of B signals, respectively, a pair of focusing signals (A focusing signal and B focusing signal) used in the on-imaging plane phase difference AF is obtained. Then, the pair of focusing signals are overlapped with each other while shifting the relative positions thereof, and at each shifted position, a correlation calculation of obtaining, for example, the area (correlation amount) of the difference portion of the waveforms is performed. The shifted position where this correlation amount is the smallest, that is, the phase difference (hereinafter referred to as "image shift amount") corresponding to the shift amount with which the correlation is the highest is obtained, and a defocus amount and the defocus direction of the imaging optical system is calculated from the calculated image shift amount.

By using the image sensor 6 having the structure as described above, it is possible to perform live view shooting by the image sensor 6 of receiving light and providing a subject image that can be observed in real time, as well as to perform phase difference focus detection without using a mechanism for splitting light from a subject.

In this embodiment, the explanation will be given based on the assumption that all pixels of the image sensor 6 are configured as focus detection pixels, the photodiodes 212 receive the luminous flux passing through the area approximately on the left half of the exit pupil, and the photodiodes 211 receive the luminous flux passing through the area approximately on the right half of the exit pupil. In this case, the distance between the adjacent photodiodes 211 and the distance between the adjacent photodiodes 212 in the dividing direction is equal to the distance between the adjacent focus detection pixels.

The image sensor 6 having the above configuration converts light from a subject incident through the imaging optical system 3 into an electric signal by photoelectric conversion and outputs the electric signal, which is input to the image processing unit 7.

The image processing unit 7 has an A/D converter, a white balance adjustment circuit, a gamma correction circuit, an interpolation calculation circuit, and the like inside, and can generate an image for recording. A color interpolation processing circuit is also provided in the image processing unit 7, and performs color interpolation (demosaicing) processing on Bayer arrayed signals to generate a color image. Further, the image processing unit 7 compresses images, moving images, sounds, etc. using predetermined methods. The image processing unit 7 performs not only such processing for image shooting but also so-called focus detection processing by processing pixel signals from the focus detection pixels in cooperation with the focus detection unit 11 during a period between shootings of images.

The focus detection unit 11 cooperates with the image processing unit 7 to detect the image shift amount between the optical images based on the output from the focus detection pixels included in the image sensor 6, and convert the image shift amount into a defocus amount by applying a known method. The camera system control unit 5 sends focus adjustment information to the lens system control unit 15 based on the defocus amount outputted from the focus detection unit 11, and the lens system control unit 15 actuates the focus lens in the direction of the optical axis 4 via the focus adjustment unit 22.

Further, the camera system control unit 5 obtains an appropriate exposure amount by performing a predetermined arithmetic computation using the image data obtained by the image processing unit 7, and controls the aperture included in the imaging optical system 3 and the exposure period of the image sensor 6 based on the exposure amount.

By appropriately adjusting the imaging optical system 3, the image sensor 6 is exposed with an appropriate amount of light from the subject, and the subject image is formed in the vicinity of the image sensor 6.

In the present embodiment, the camera shake detection unit 13 uses a vibrating gyro that utilizes the Coriolis force, and detects rotational shake applied to the camera body 1. The camera shake detection unit 13 detects a shake of the camera body 1 (hereinafter, referred to as "camera shake") caused by a user's hand shake or the like, and outputs a camera shake detection signal indicating the camera shake to the camera system control unit 5. The camera system control unit 5 calculates a shift amount (correction amount) of the image sensor 6 for reducing (cancelling) image blur due to the camera shake using the camera shake detection signal, and issues an image stabilization instruction including the shift amount to the camera image stabilization unit 12. The camera image stabilization unit 12 controls an actuator included in the shift mechanism in accordance with the image stabilization instruction from the camera system control unit 5 to shift the image sensor 6 by the shift amount in the plane orthogonal to the optical axis 4. As a result, sensor image stabilization is performed.

Further, in addition to the image stabilization control, the camera image stabilization unit 12 performs periodic actuation control on the image sensor 6 so as to reduce the influence of moiré caused by the spatial aliasing of the high spatial frequency components of the subject image under control of the camera system control unit 5. This realizes the function as a vibration-type low-pass filter in the present embodiment. Note that details of the actuation control in this embodiment will be described later.

Here, the effects and problems of a low-pass filter realized by applying the periodic actuation control of the conventional vibration-type low-pass filter described in Japanese Patent Laid-Open No. 2021-071573 will be described. Note that the vibration-type low-pass filter is realized in such a manner that the camera image stabilization unit 12 and/or the lens image stabilization unit 18 moves at least one of the image sensor 6 and the image stabilization lens unit 19 in a direction perpendicular to the optical axis so that the position of the light incident on the image sensor 6 is shifted. Therefore, in the following description, the image sensor 6, the image stabilization lens unit 19, and the combination of the image sensor 6 and the image stabilization lens unit 19 are collectively referred to as a "shake correction member."

Figure 3A:
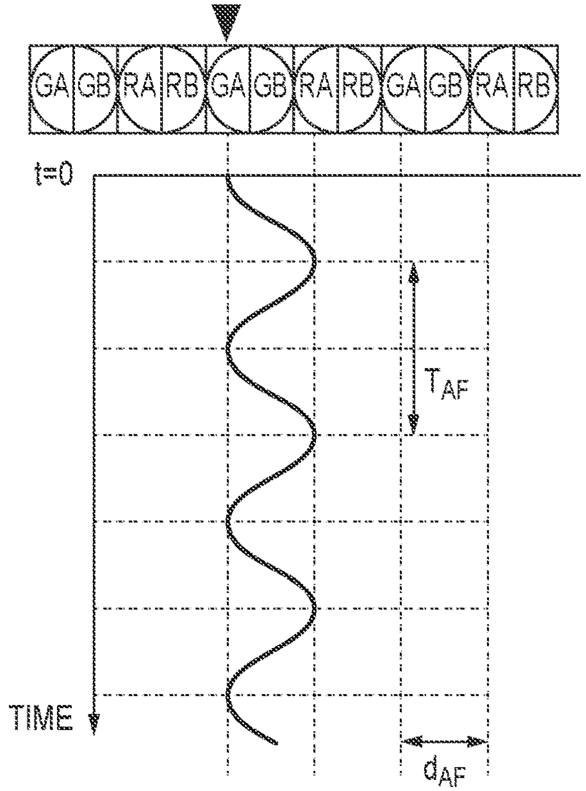
FIG. 3A is a schematic diagram in a case where conventional control of an incident position of incident light using a vibration-type low-pass filter is applied to the present invention.

FIG. 3A is a schematic diagram showing a periodic locus of the incident light caused by the shake correction member. The upper part of FIG. 3A shows a part of the R (red) and G (green) row of the Bayer array among the pixels that constitute the image sensor 6. The area corresponding to the photodiode on the left side of the pixel is conveniently referred to as an A area, the area corresponding to the photodiode on the right side of the pixel is conveniently referred to as a B area, and the A areas of the R pixels and G pixels are labelled RA and GA, respectively, and the B areas of the R pixels and G pixels are labelled RB and GB, respectively.

The lower part of FIG. 3A shows the change in the position (incidence position) of the incident light on the GA pixel indicated by ▼ at time t=0 with respect to time, and the vertical axis represents the passage of time downward, and the horizontal axis indicates the position in the horizontal direction. A period $T_{AF}$ corresponding to two scales of the dotted lines in the time direction indicates the vertical synchronization period, that is, the exposure period during focus detection or the exposure period during shooting, and the focus detection process is performed once in an integer-multiple of this exposure period $T_{AF}$. Further, the position corresponding to one scale of the dotted line in the position direction represents a distance $d_{AF}$ between focus detection pixels. That is, the amplitude of the periodic locus of the incident light shown in FIG. 3A is ½ of the distance $d_{AF}$ between the focus detection pixels. The periodic locus of the incident light shown in FIG. 3A can be realized by periodical actuation control of the shake correction member in the horizontal direction.

In recent years, the frame rate during image shooting and focus detection has been significantly increased, and as a result, the exposure period $T_{AF}$ has become extremely short. On the other hand, in order to achieve low-pass filter characteristics that can reduce frequency components above the trap point by periodically driving the shake correction member, it is desirable to shift the position of the incident light for one cycle or more (integer cycle/cycles) during the exposure period $T_{AF}$, as shown in FIG. 3A. Conversely, if the set exposure time is long, there is no need to increase the actuation frequency of the shake correction member in order to suppress power consumption. Therefore, the actuation frequency of the shake correction member may be changed according to the exposure period so that the position of the incident light is shifted by one cycle or more during the exposure period $T_{AF}$.

Figure 3B:
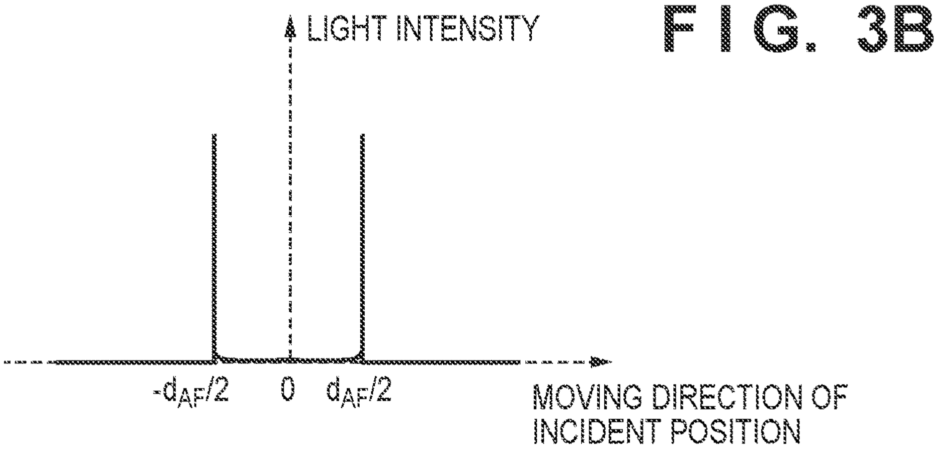
FIGS. 3B and 3C are schematic diagrams for explaining the low-pass filter characteristics obtained by controlling the incident position as shown in FIG. 3A and problems thereof.

FIG. 3B illustrates a point spread function (referred to as "PSF", hereinafter) in a case where the shake correction member is actuated so that the light flux from a point light source forms an image on an imaging plane of the image sensor 6 to draw a periodic locus as shown in FIG. 3A, and shows a one-dimensional graph of the periodic locus only in the moving direction on the imaging plane of the image sensor 6. The horizontal axis represents the moving direction of the incident position, and the vertical axis represents the light intensity. If the shake correction member is actuated so as to have a periodic locus with an amplitude of ½ of the distance $d_{AF}$ between the focus detection pixels as shown in FIG. 3A, then, as shown in FIG. 3B, the light intensity becomes large at the positions $\pm d_{AF}/2$, which are the extreme values with the center of the periodic locus being 0. In other words, the point spread function has two light intensity peaks.

Figure 3C:
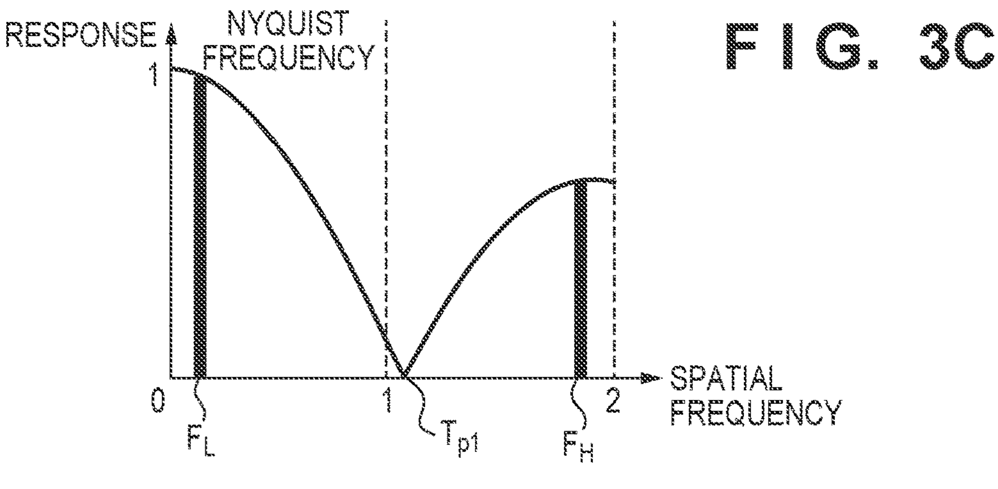
Figure 10:
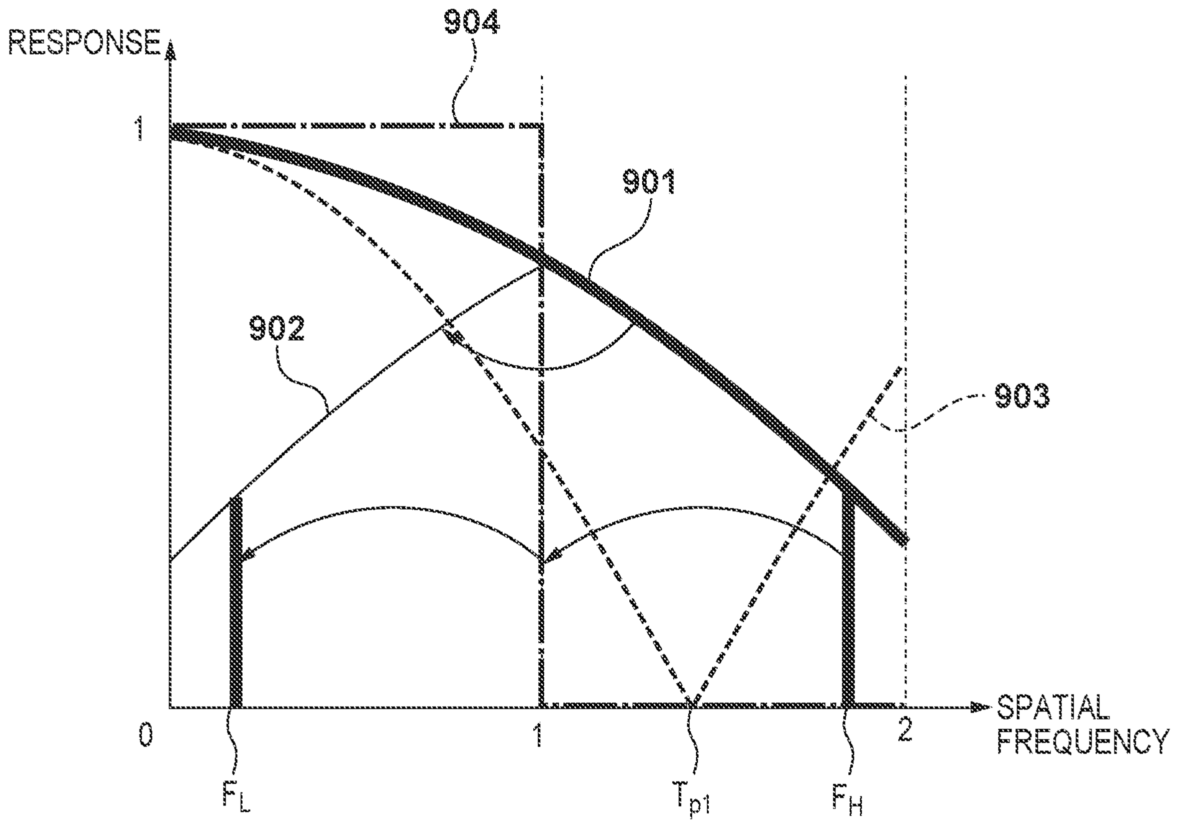
FIG. 10 is a schematic diagram showing response characteristics of a conventional optical system with respect to spatial frequency.

FIG. 3C is a diagram schematically showing a modulation transfer function (hereinafter referred to as "MTF characteristic") obtained by Fourier transforming the PSF shown in FIG. 3B obtained with the periodic locus as shown in FIG. 3A. The horizontal axis represents the spatial frequency, and the vertical axis represents its response. That is, FIG. 3C shows the response characteristics (low-pass filter characteristics) of a vibration-type low-pass filter realized by moving the shake correction member so that the periodic locus of the incident light shown in FIG. 3A is obtained. In FIG. 3A, the shake correction member is actuated so that the periodic locus of the incident light has an amplitude ($d_{AF}/2$) equivalent to ½ pixel pitch of the image sensor 6, so the actually obtained low-pass filter characteristics has a trap point ($T_{p1}$) at a frequency slightly higher than the Nyquist frequency as shown in FIG. 3C. As explained with reference to FIG. 10, the detection frequency for focus detection is often set in a relatively low frequency range, such as the frequency $F_L$. Therefore, the frequency component of frequency $F_H$ appears as aliasing noise. Therefore, with the low-pass filter characteristics shown in FIG. 3C, it is not possible to obtain the effect of reducing aliasing noise during focus detection.

Next, another periodic moving control of the incident position of incident light performed by actuating the shake correction member and the resulting low-pass filter characteristics will be described using FIGS. 4A to 4C.

Figure 4A:
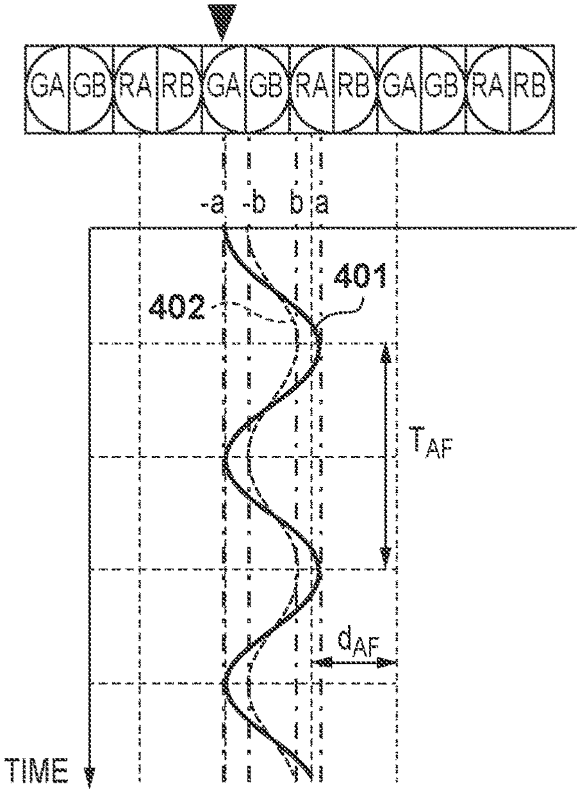
FIG. 4A is a schematic diagram illustrating periodic loci of incident light caused by a vibration-type low-pass filter according to the first embodiment.

FIG. 4A shows waveforms with two different amplitudes in a case where the incident position of the incident light is moved to form a linear periodic locus in one direction in a plane perpendicular to the optical axis 4 (here, division direction of the focus detection pixels, that is, the phase difference detection direction). In FIG. 4A, a solid line 401 indicates a periodic locus having an amplitude a larger than the amplitude ($d_{AF}/2$) shown in FIG. 3A, and a broken line 402 indicates a periodic locus having an amplitude b smaller than $d_{AF}/2$. The amplitude a of the periodic locus 401 is larger than ½ of the distance $d_{AF}$ between the focus detection pixels and smaller than the distance $d_{AF}$.

Figure 4B:
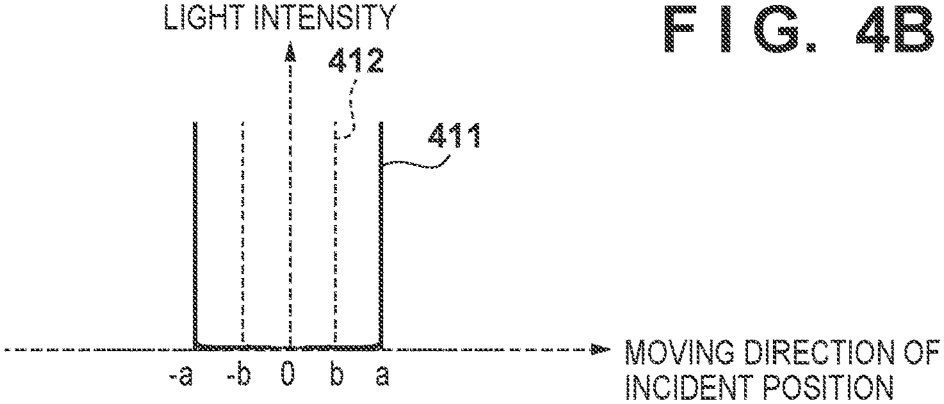
FIGS. 4B and 4C are schematic diagrams for explaining the low-pass filter characteristics obtained by the periodic loci of the incident light shown in FIG. 4A.

FIG. 4B shows the PSF of light that forms an image on the imaging plane of the image sensor 6 in a case where the shake correction member is actuated so that the light flux from a point light source draws a periodic locus as shown in FIG. 4A on the image sensor 6. A solid line 411 in FIG. 4B indicates a PSF corresponding to the periodic locus 401 in FIG. 4A, and a broken line 412 indicates a PSF corresponding to the periodic locus 402 in FIG. 4A. In this case as well, as in FIG. 3B, the light intensity becomes large at the extreme values of each of the periodic loci 401 and 402 (±a for PSF 411 and ±b for PSF 412).

Figure 4C:
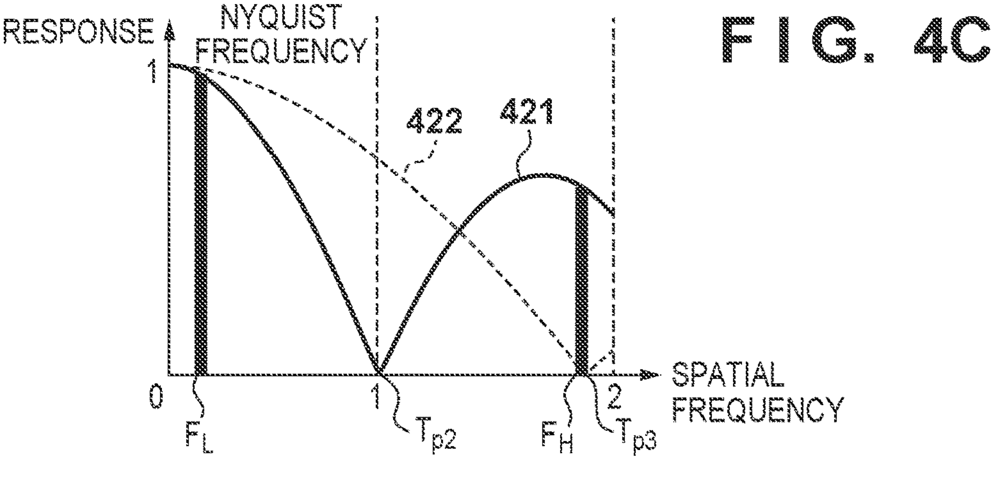

FIG. 4C shows MTF characteristics. The low-pass filter characteristics obtained by actuating the shake correction member so as to form the periodic locus 401 shown in FIG. 4A are as shown by a solid line 421 in FIG. 4C. Further, the low-pass filter characteristics obtained by actuating the shake correction member so as to form the periodic locus 402 shown in FIG. 4A are as shown by a broken line 422 in FIG. 4C.

Generally, the larger the amplitude, the greater the effect of the resulting low-pass filter, and therefore the trap point is formed on the low frequency side. Since the amplitude a of the periodic locus 401 shown in FIG. 4A is larger than the amplitude of the periodic locus shown in FIG. 3A, low-pass filter characteristics 421 shown in FIG. 4C are obtained. Furthermore, the amplitude a of the periodic locus 401 shown in FIG. 4A is determined so that a trap point ($T_{p2}$) of the low-pass filter characteristics 421 coincides with the Nyquist frequency.

On the other hand, since the amplitude b of the periodic locus 402 shown in FIG. 4A is smaller than the amplitude a of the periodic locus 401, low-pass filter characteristics 422 shown in FIG. 4C are obtained, and a trap point ($T_{p3}$) is formed at a frequency higher than the Nyquist frequency. As can be seen from FIG. 4C, the low-pass filter characteristics 422 can reduce the absolute amount of aliasing noise corresponding to the frequency $F_H$ more effectively than the low-pass filter characteristics 421.

In this way, the low-pass filter characteristics of the periodic locus obtained by actuating the shake correction member can be arbitrarily controlled by changing the amplitude.

A method for obtaining more effective low-pass filter characteristics will be described in consideration of the above-mentioned characteristics.

Figure 5A:
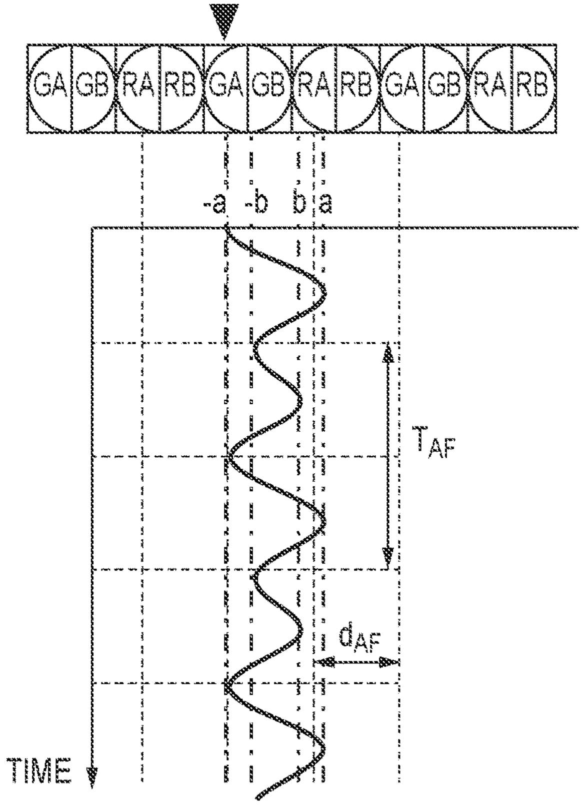
FIG. 5A is a schematic diagram illustrating a periodic locus of incident light caused by the vibration-type low-pass filter according to the first embodiment.

FIG. 5A is a schematic diagram illustrating a periodic locus of incident light caused by the vibration-type low-pass filter in this embodiment. This periodic locus shows a periodic locus in a case where the incident position of the incident light is moved for one cycle to form the periodic locus 401 with the amplitude a shown in FIG. 4A and for one cycle to form the periodic locus 402 with the amplitude b shown in FIG. 4A during each exposure period $T_{AF}$.

Figure 5B:
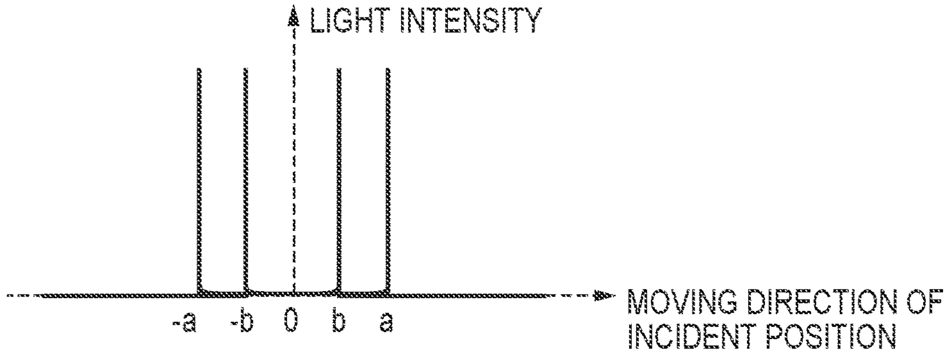
FIGS. 5B and 5C are schematic diagrams for explaining the low-pass filter characteristics obtained by the periodic locus of the incident light shown in FIG. 5A.

FIG. 5B shows a PSF obtained in a case where the shake correction member is actuated to form the periodic locus shown in FIG. 5A. The PSF shown in FIG. 5B is a combination of a PSF 411 and a PSF 412 shown in FIG. 4B, and the light intensity becomes large at the extreme values −a, a, −b, and b of the periodic locus shown in FIG. 5A. In other words, the PSF has four light intensity peaks. Furthermore, in FIG. 5A, −a, a, −b, and b are distributed over GA, GB, and RA. That is, light emitted from the same point passes through the imaging optical system 3 and enters a plurality of different pixels of the image sensor 6.

Figure 5C:
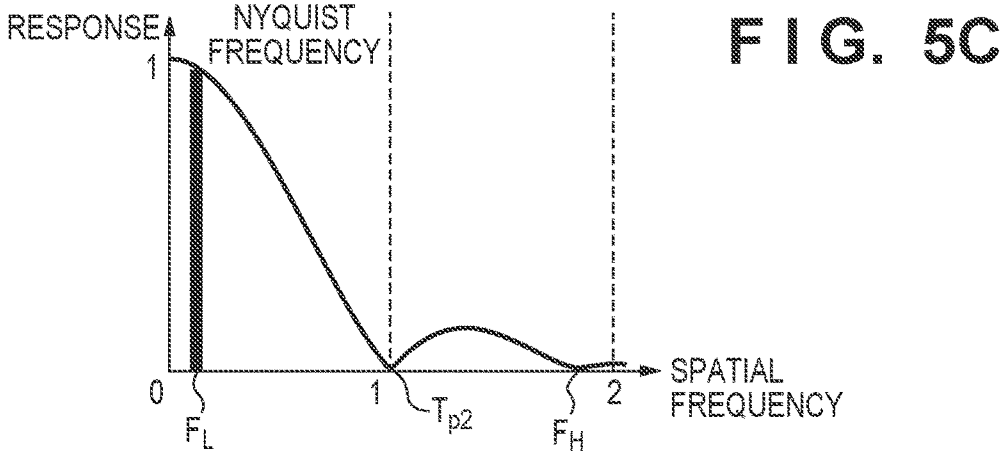

MTF characteristics obtained from the PSF shown in FIG. 5B is as shown in FIG. 5C. Low-pass filter characteristics shown in FIG. 5C are the product of the low-pass filter characteristics 421 and the low-pass filter characteristics 422 shown in FIG. 4C. Therefore, it is possible to more effectively reduce the absolute amount of aliasing noise at frequency $F_H$ than the low-pass filter characteristics 421 shown in FIG. 4C, which are obtained when the shake correction member is actuated to form a periodic locus with a single amplitude. Further, it is possible to more effectively suppress signals exceeding the Nyquist frequency that produce moiré signals in images in addition to the aliasing noise corresponding to frequency $F_H$ during focus detection.

In the example shown in FIGS. 5A to 5C, a case has been described in which the shake correction member is actuated so that the periodic locus of the incident light has two amplitudes, amplitude a and amplitude b. However, the present invention is not limited to this, and the shake correction member may be controlled so that the periodic loci having at least two types of amplitudes, respectively, are formed in each exposure period $T_{AF}$ of the image sensor 6, and the periodic loci having three or more types of amplitudes, respectively, may be formed.

In addition, as for the plurality of amplitudes, with respect to the smallest amplitude as a reference first amplitude, other amplitudes should not be an integer multiple of the first amplitude, which makes it possible to avoid trap points formed at the same frequency. Thereby, high frequencies higher than the Nyquist frequency can be cut more effectively. For example, in a case where the incident position of the incident light is moved so as to have a periodic locus of three or more cycles during each exposure period $T_{AF}$, it is conceivable to set a first amplitude and a second amplitude different from the first amplitude, and then gradually change the amplitude from the first amplitude to the second amplitude.

In addition, aliasing noise can be suppressed more effectively by synthesizing periodic loci of incident light with various amplitudes, but for the purpose of preserving the perceived image resolution and the focus detection signals, in general, it is better not to reduce positive signals (signals with frequencies below the Nyquist frequency) too much.

Further, during focus detection, it is sufficient if the detection frequency FL remains, but during image recording, the entire positive signal (signal below the Nyquist frequency) is required to keep good image resolution. Therefore, the amplitude of the periodic locus of the incident light may be controlled so that different low-pass filter characteristics will be obtained during focus detection and during image recording.

As described above, the periodic locus shown in FIG. 5A can be obtained by actuating at least one of the image stabilization lens unit 19 and the image sensor 6. However, an actuation method in a case where the both of the image stabilization lens unit 19 and the image sensor 6 are actuated will be explained below.

Figure 6:
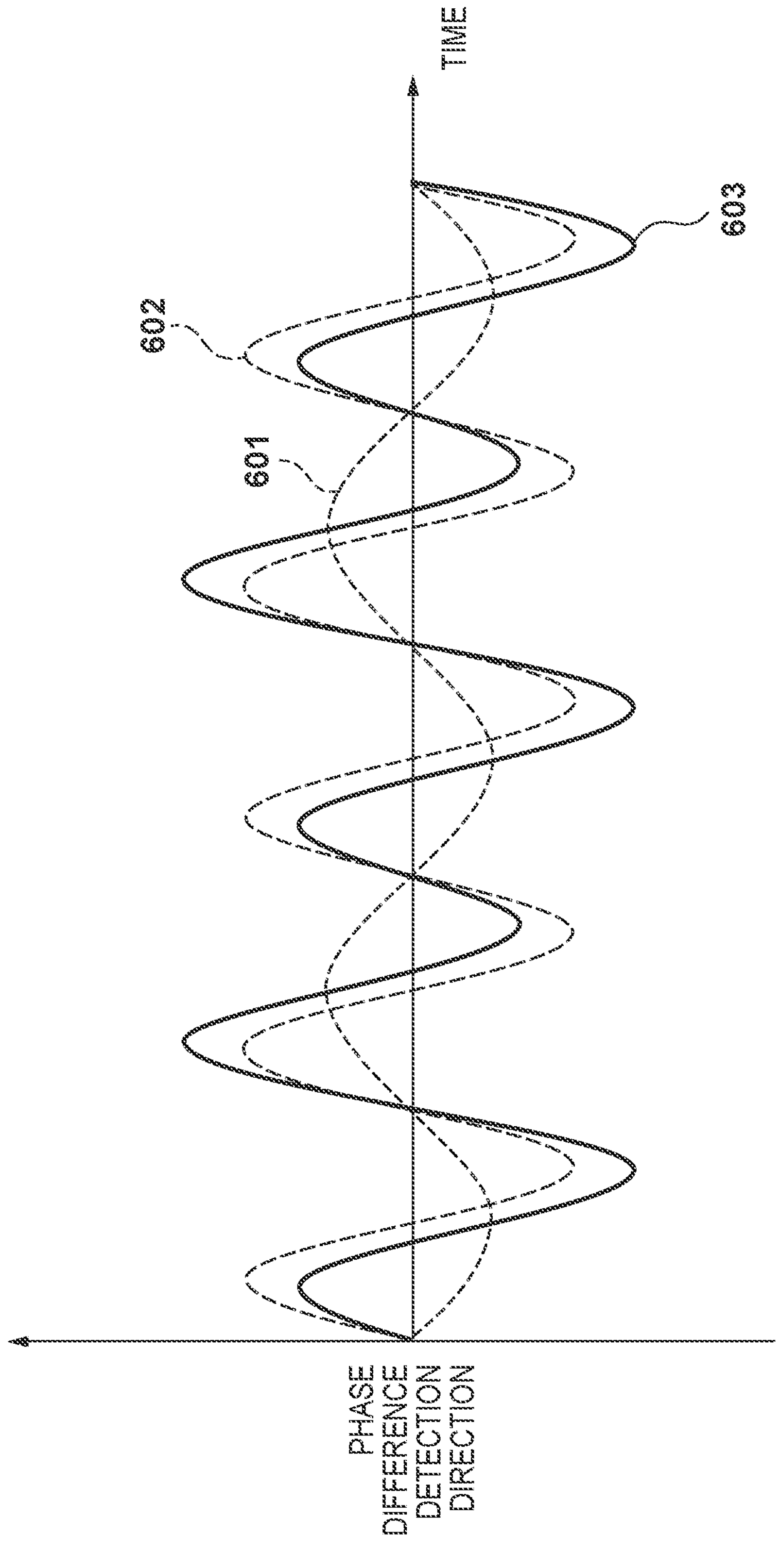
FIG. 6 is a schematic diagram showing an example of periodic loci obtained by moving an image stabilization lens unit and an image sensor, respectively, to obtain the periodic locus shown in FIGS. 5A to 5C.

FIG. 6 shows periodic loci in a case where the lens image stabilization unit 18 and the camera image stabilization unit 12 actuate the image stabilization lens unit 19 and the image sensor 6, respectively, so that the incident position of the incident light is periodically moved in the phase difference detection direction, and a composite waveform of these two periodic loci. The horizontal axis indicates time, and the vertical axis indicates the position in the phase difference detection direction.

In the example shown in FIG. 6, the image stabilization lens unit 19 and the image sensor 6 are actuated so that the periodic loci of the incident light respectively form a sine wave waveform having mutually different amplitudes in the phase difference detection direction and frequencies. A broken line 601 in FIG. 6 represents a periodic locus obtained by actuating the image sensor 6 by the camera image stabilization unit 12, and a dashed line 602 represents a periodic locus obtained by actuating the image stabilization lens unit 19 by the lens image stabilization unit 18. Further, a solid line 603 is a composite periodic locus of the periodic locus 601 and the periodic locus 602.

By actuating the image stabilization lens unit 19 and the image sensor 6 in this manner, it is possible to form a composite periodic locus in which periodic loci of different amplitudes are alternately formed. This composite periodic locus is the same periodic locus of the incident position of incident light on the image sensor 6 shown in FIG. 5A with respect to time.

Although FIG. 6 shows an example in which the image stabilization lens unit 19 and the image sensor 6 are actuated with sinusoidal periodic loci with mutually different amplitudes and frequencies, the present invention is limited to the periodic loci shown in FIG. 6. Any periodic loci may be conceivable as long as a composite periodic locus thereof can exert a desired low-pass filter effect by combining two periodic loci obtained by actuating the image stabilization lens unit 19 and the image sensor 6 so as to have mutually different amplitudes and frequencies.

As described above, according to the first embodiment, more effective low-pass filter characteristics can be obtained by actuating the shake correction member so that the periodic locus of the incident light has a plurality of different amplitudes during each exposure period.

Second Embodiment

Next, a second embodiment of the present invention will be described. In the second embodiment, another example of periodic moving control of incident light using a vibration-type low-pass filter will be described. Note that an image capturing apparatus in the second embodiment is the same as that described in the first embodiment with reference to FIGS. 1A, 1B, and 2, and therefore a description thereof will be omitted.

Figure 7A:
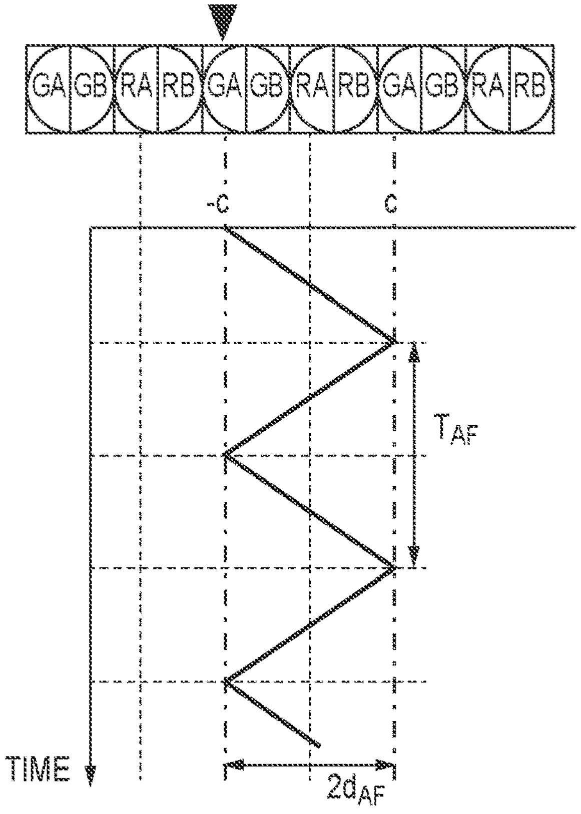
FIG. 7A is a schematic diagram illustrating a periodic locus of incident light caused by the vibration-type low-pass filter according to a second embodiment.

FIG. 7A is a schematic diagram showing a periodic locus of incident light in the second embodiment, and shows a temporal change of the incident position of the incident light on the image sensor 6 in the phase difference detection direction. This locus can be realized by actuating the shake correction member in a plane perpendicular to the optical axis 4 in one direction. In the example of FIG. 7A, the periodic locus is a triangular wave, and the shake correction member is actuated so that one cycle of the periodic locus is formed in each exposure period $T_{AF}$.

Although the example shown in FIG. 7A shows a case where one cycle of the periodic locus is formed during each exposure period $T_{AF}$, the present invention is not limited to this, and the shake correction member may be actuated for one or more of integer cycles during each exposure period $T_{AF}$. Further, in the example shown in FIG. 7A, the shake correction member is actuated so that the amplitude of the periodic locus becomes the distance $d_{AF}$ between the focus detection pixels, that is, both amplitudes of $2\times d_{AF}$. In FIG. 7A, as an amplitude c, the extreme values of the periodic locus of the triangular wave are expressed as −c and c, and c is the same length as the distance $d_{AF}$ between the focus detection pixels.

Figure 7B:
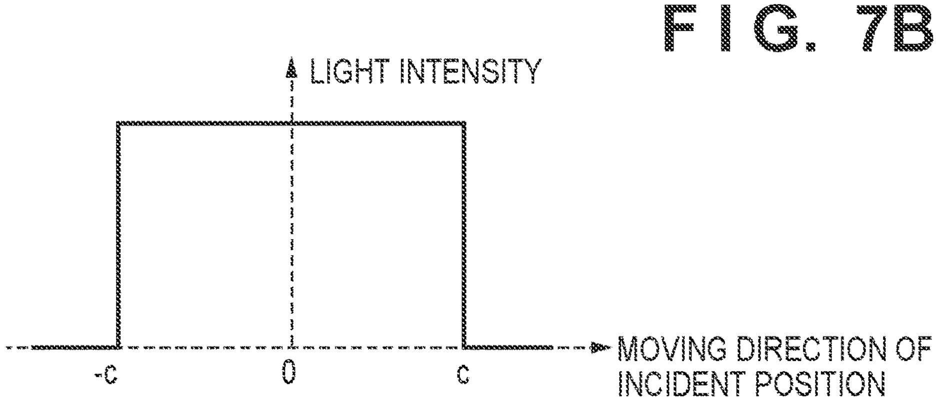
FIGS. 7B and 7C are schematic diagrams for explaining the low-pass filter characteristics obtained by the periodic locus of the incident light shown in FIG. 7A.

FIG. 7B shows a PSF obtained when the shake correction member is actuated to have the periodic locus shown in FIG. 7A. The PSF shown in FIG. 7B has a constant light intensity between the extreme values −c and c in FIG. 7A. In other words, the PSF is a rectangular function. Furthermore, in FIG. 7A, −c and c are distributed over two GAs, GB, RA, and RB. That is, light emitted from the same point passes through the imaging optical system 3 and enters a plurality of different pixels of the image sensor 6.

Figure 7C:
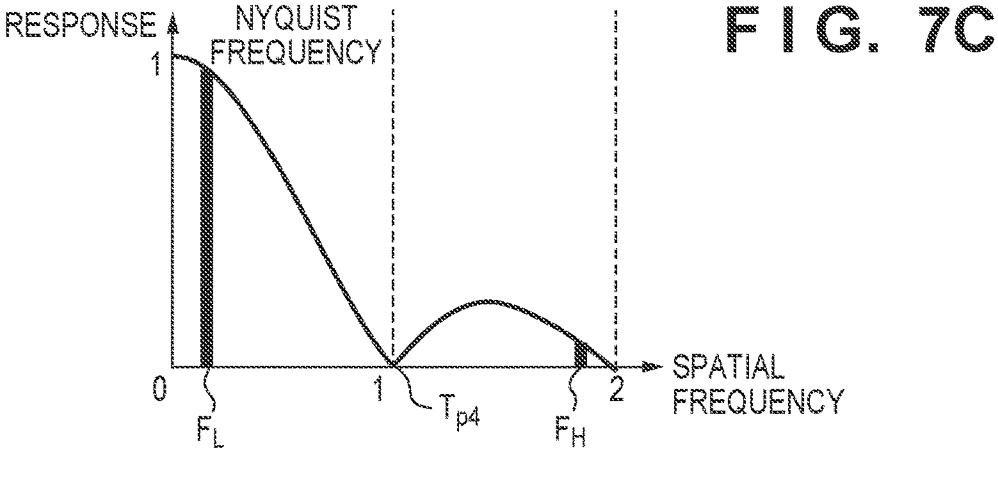

MTF characteristics obtained from this PSF are as shown in FIG. 7C. By setting the amplitude of the periodic locus of the triangular wave as shown in FIG. 7A to the distance $d_{AF}$ between the focus detection pixels, the trap point ($T_{p4}$ in FIG. 7C) can be set at the Nyquist frequency. The resulting low-pass filter characteristics can reduce the absolute amount of aliasing noise corresponding to frequency $F_H$ more effectively than the low-pass filter characteristics 421 shown in FIG. 4C. Further, it is possible to more effectively suppress signals exceeding the Nyquist frequency that generate moiré signals in images in addition to the aliasing noise at frequency $F_H$ during focus detection.

Further, the periodic locus shown in FIG. 5A requires a periodic locus to have a plurality of amplitudes during each exposure period $T_{AF}$, whereas the periodic locus shown in FIG. 7A requires a periodic locus to have one amplitude during each exposure period $T_{AF}$. Therefore, in the periodic locus shown in FIG. 7A, the actuation frequency of the shake correction member can be lowered compared to the periodic locus shown in FIG. 5A, so that in a case where the exposure period $T_{AF}$ is short, the responsiveness to the actuation of the shake correction member can be increased. In this manner, in this embodiment, more effective low-pass filter characteristics can be achieved by actuating the shake correction member so as to have a periodic locus of a triangular wave.

As described above, the periodic locus shown in FIG. 7A can be obtained by actuating at least one of the image stabilization lens unit 19 and the image sensor 6, however, an actuation method in a case where both of the image stabilization lens unit 19 and the image sensor 6 are actuated will be explained below.

Figure 8A:
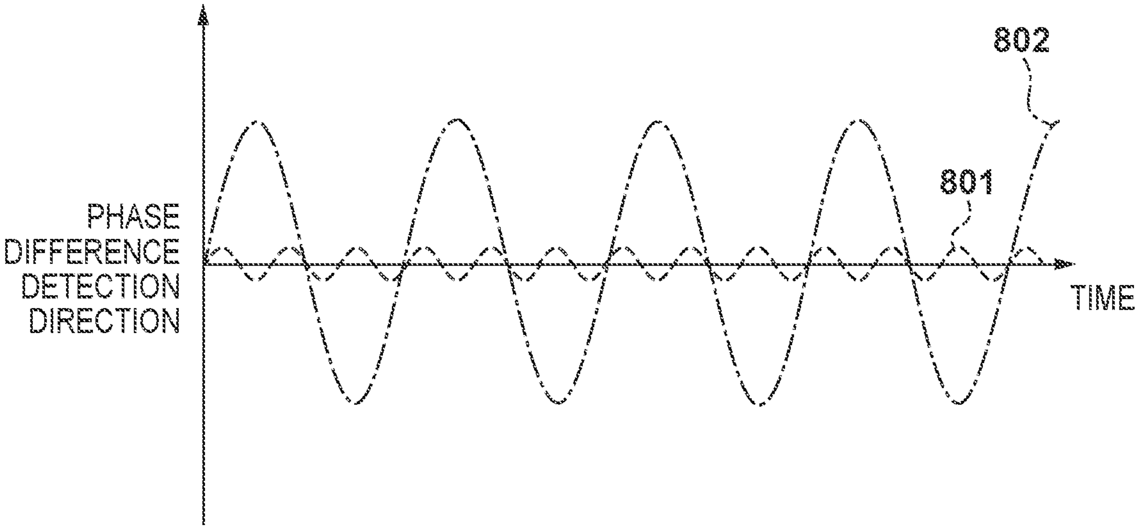
FIGS. 8A and 8B are schematic diagrams showing an example of periodic loci obtained by moving an image stabilization lens unit and an image sensor, respectively, to obtain the periodic locus shown in FIGS. 7A to 7C.
Figure 8B:
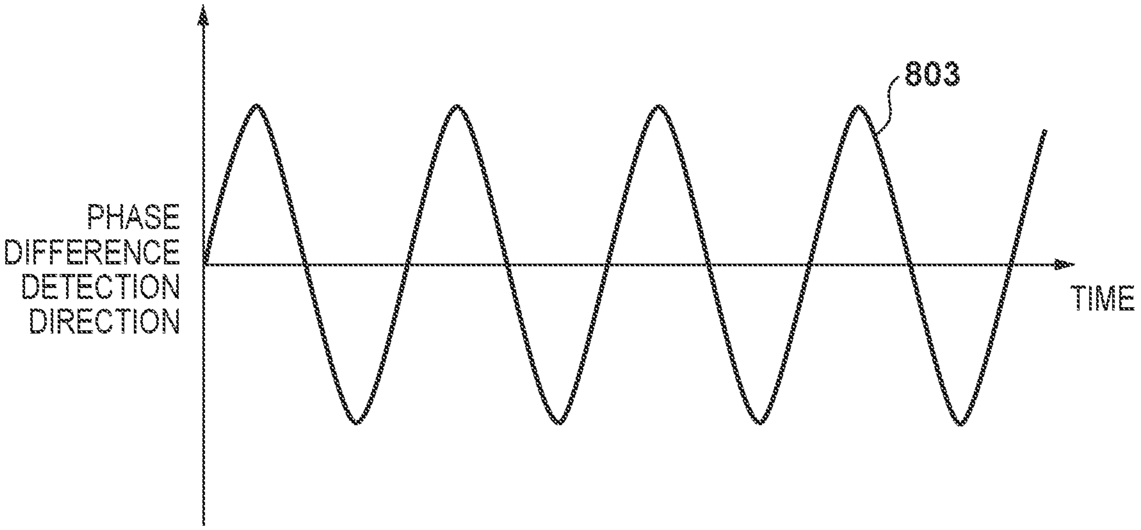

FIGS. 8A and 8B show periodic loci in a case where the lens image stabilization unit 18 and the camera image stabilization unit 12 actuates the image stabilization lens unit 19 and the image sensor 6, respectively, so that the incident position of the incident light is periodically moved in the phase difference detection direction, and a composite periodic locus thereof. The horizontal axis indicates time, and the vertical axis indicates the position in the phase difference detection direction.

In the example shown in FIGS. 8A and 8B, the image stabilization lens unit 19 and the image sensor 6 are actuated such that the resultant periodic loci of the incident light are to have sine wave waveforms with mutually different amplitudes and frequencies in the phase difference detection direction. In FIG. 8A, a broken line 801 indicates a periodic locus obtained by actuating the image sensor 6 by the camera image stabilization unit 12, and a dashed line 802 indicates a periodic locus obtained by actuating the image stabilization lens unit 19 by the lens image stabilization unit 18. Further, a solid line 803 in FIG. 8B is a composite periodic locus of the periodic locus 801 and the periodic locus 802.

The periodic locus obtained by actuating the image sensor 6 has ⅑ of the amplitude and three times of the frequency of the periodic locus obtained by actuating the image stabilization lens unit 19. By actuating the image sensor 6 and the image stabilization lens unit 19 in this way, it is possible to obtain a composite periodic locus having a waveform of a substantially triangular wave. This composite periodic locus has a waveform of a periodic locus that is close to the change in position of light flux from a subject incident on the image sensor 6 shown in FIG. 7A with respect to time.

In this embodiment, it is desirable to obtain the periodic locus as shown in FIG. 7A by actuating either the image stabilization lens unit 19 or the image sensor 6. However, as the exposure period TAF becomes shorter, it is necessary to actuate the shake correction member at a higher frequency, which deteriorates the followability of the response to the actuation of the shake correction member, and the waveform may be deformed from the triangular wave toward a sine wave. In such a case, it is effective to obtain a composite periodic locus having a waveform close to a triangular wave by actuating both the image stabilization lens unit 19 and the image sensor 6 so as to obtain a periodic locus as shown in FIG. 8A.

PSF and MTF characteristics of the composite periodic locus shown in FIG. 8B are similar to those shown in FIGS. 7B and 7C. Therefore, by driving the image stabilization lens unit 19 and the image sensor 6 so as to obtain a composite periodic locus having a waveform that is close to a periodic locus having the triangular wave as shown in FIG. 8A, more effective low-pass filter characteristics can be achieved.

Note that the periodic loci corresponding to actuation of the image stabilization lens unit 19 and the image sensor 6 to obtain a composite periodic locus having a waveform close to a triangular wave are not limited to the periodic loci shown in FIG. 8A. Any periodic loci are acceptable as long as a composite periodic locus having a waveform close to a triangular wave can be obtained by compositing two periodic loci obtained by actuating the image stabilization lens unit 19 and the image sensor 6 so that the periodic loci have mutually different amplitudes and frequencies.

As described above, according to the second embodiment, more effective low-pass filter characteristics can be achieved by actuating the shake correction member so that the periodic locus of the incident light has a waveform of a triangular wave during each exposure period.

Third Embodiment

Next, a third embodiment of the present invention will be described. Note that an image capturing apparatus in the third embodiment is the same as that described in the first embodiment with reference to FIGS. 1A, 1B, and 2, and therefore a description thereof will be omitted.

In the first and second embodiments described above, the methods have been described in which the shake correction member is actuated so as to have a linear periodic locus in the horizontal direction (focus detection direction). However, the image sensor 6 extends both in the horizontal and vertical directions. Accordingly, in the third embodiment, a case will be described in which the shake correction member is actuated so as to form a periodic locus also in the vertical direction.

Figure 9A:
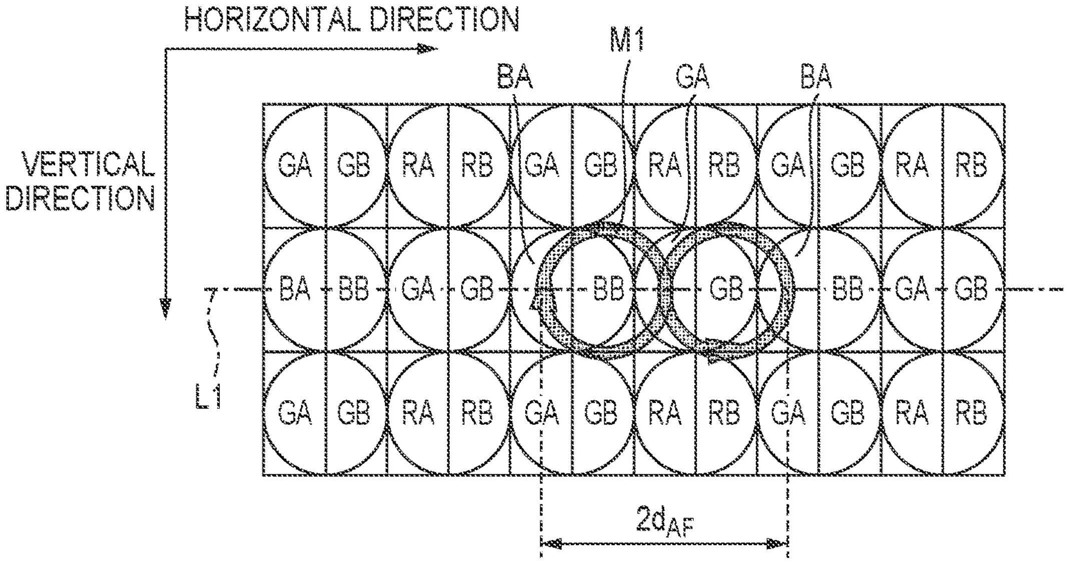
FIGS. 9A to 9C are schematic diagrams illustrating periodic loci of incident light caused by the vibration-type low-pass filter according to a modification.

FIG. 9A is a schematic diagram of a periodic locus of incident light obtained by actuating the shake correction member in the third embodiment. In the example of FIG. 9A, the shake correction member is actuated in a plane orthogonal to the optical axis 4 so as to draw a shape like an Arabic FIG. 8. Further, the shake correction member is actuated so that the direction in which the two circles that form the FIG. 8 of the periodic locus are connected in the phase difference detection direction. Further, as for the figure-8-shaped periodic locus in FIG. 9A, if one cycle is defined as the period of drawing the FIG. 8, the shake correction member is actuated so that one or more of integer cycles are included in each exposure period $T_{AF}$. Further, in the example shown in FIG. 9A, the shake correction member is actuated so that the length between both ends of the figure-8-shaped periodic locus in the horizontal direction is twice the distance $d_{AF}$ between the focus detection pixels.

Figure 9B:
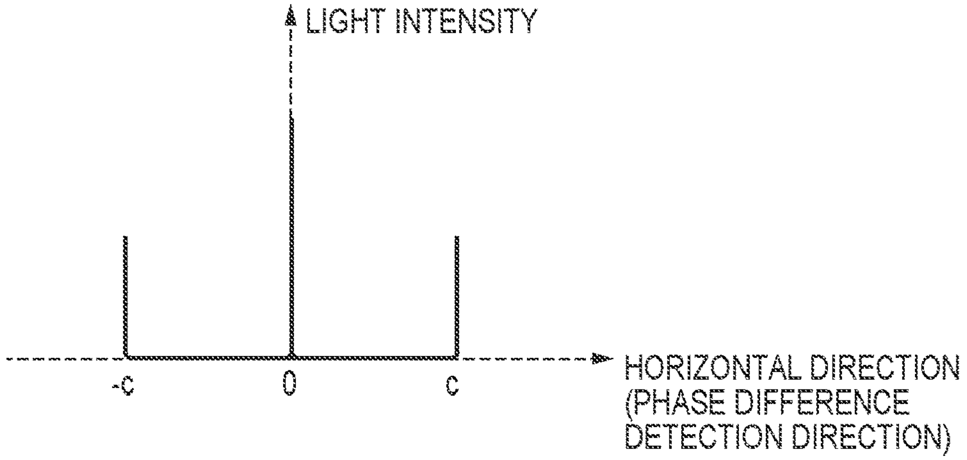

FIG. 9B shows a PSF obtained in a case where the shake correction member is driven to have the periodic locus shown in FIG. 9A. The horizontal axis indicates the horizontal direction of the image sensor 6 in FIG. 9A, that is, the direction in which the phase difference is detected by focus detection, and the PSF is plotted with respect to the vertical center line (L1 in FIG. 9A) of the figure-8-shaped periodic locus. Further, in the example shown in FIG. 9B, the horizontal center position of the figure-8-shaped periodic locus is indicated as 0, the left end as −c, and the right end as c, where c is the same length as the distance $d_{AF}$. This PSF has three light intensity peaks, with the largest light intensity at the horizontal center position 0 of the figure-8-shaped periodic locus, and the next largest light intensities at −c and c. Further, as shown in FIG. 9A, −c is distributed in BA, 0 is distributed in GA, and c is distributed in another BA. That is, light emitted from the same point passes through the imaging optical system 3 and enters a plurality of different pixels of the image sensor 6.

Figure 9C:
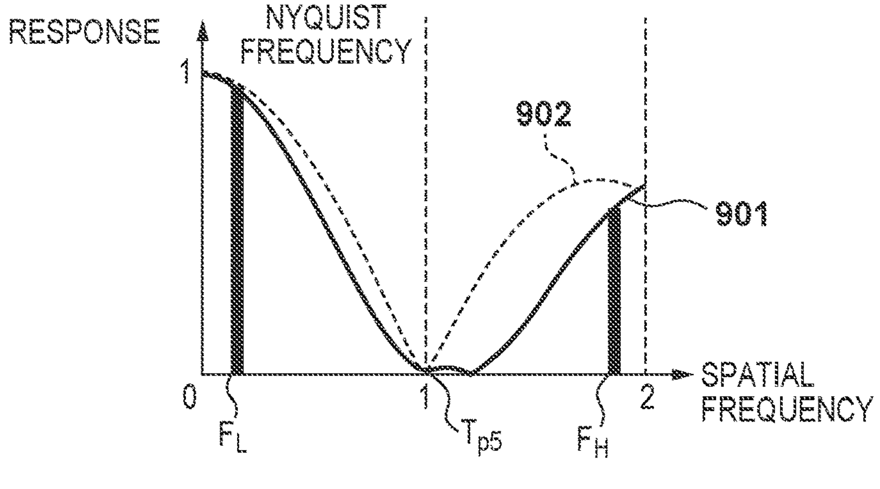

The low-pass filter characteristics obtained from the PSF shown in FIG. 9B are as shown by a solid line 901 in FIG. 9C. A broken line 902 in FIG. 9C is the low-pass filter characteristics 421 corresponding to the periodic locus shown in FIG. 4C. As shown in FIG. 9A, by setting the length between the horizontal ends of the figure-8-shaped periodic locus to twice the distance $d_{AF}$ between the focus detection pixels, one of the trap points ($T_{p5}$) can be made to match the Nyquist frequency.

The resulting low-pass filter characteristics 901 cannot be said to be able to effectively reduce the absolute amount of aliasing noise corresponding to the frequency $F_H$ compared to the low-pass filter characteristics 902, however, they can more effectively suppress aliasing corresponding to a signal exceeding the Nyquist frequency 1 that causes moiré in images. In this way, by actuating the shake correction member so as to generate a figure-8-shaped periodic locus, more effective low-pass filter characteristics can be achieved.

As described above, according to the third embodiment, more effective low-pass filter characteristics can be achieved by actuating the shake correction member so that the periodic locus of the incident light becomes a figure-8 shape during the exposure period.

Modification

Aliasing noise can be suppressed more effectively by the actuation control which causes a variety of periodic loci as described above, but for the purpose of preserving the perceived image resolution and the focus detection signals, in general, it is better not to reduce positive signals (signals with frequencies below the Nyquist frequency) too much. Accordingly, in the first to third embodiments, examples have been described in which the trap points ($T_{p2}$, $T_{p4}$, $T_{p5}$) in the MTF characteristics are made to match the Nyquist frequency, but the present invention is not limited to this, and the trap points may be made to be equal to or higher than the Nyquist frequency. In other words, the amplitudes of the periodic loci specified in the first and second embodiments or the length between both ends of the horizontal figure-8-shaped periodic locus specified in the third embodiment may be made shorter than those explained.

Further, during focus detection, it is sufficient if the detection frequency $F_L$ remains, but during image recording, the entire positive signal (signal below the Nyquist frequency) is required for image resolution. Accordingly, the different actuation methods may be used during focus detection and during image recording.

Further, in FIG. 2, a case has been described in which the photodiodes 211 and 212 are arranged in the row direction (horizontal direction) in the focus detection pixels, but they may be arranged in the column direction (vertical direction). In that case, the direction of periodic actuation control may be the column direction. In addition, if four photodiodes are formed by dividing each focus detection pixel both in the horizontal and vertical directions, periodic actuation control may be performed in the exit pupil division direction corresponding to the combination of signals used for focus detection output from the photodiodes.

Further, in the above-described embodiments, the case where the focus detection direction based on the phase difference is one direction has been described, but the present invention is also applicable to a case where the phase difference detection directions are two. That is, a periodic locus same as the periodic locus obtained by actuating the shake correction member in only one direction in the first embodiment and the second embodiment may be formed by actuating the shake correction member in the other phase difference detection direction. If the shake correction member is actuated so as to form the same periodic loci in two directions in the same phase, the resultant periodic locus will be a linear periodic locus in a plane orthogonal to the optical axis 4, which is a feasible periodic locus, but the present invention is not limited to this. As a result, the obtained low-pass filter characteristics are similar to those described in the first and second embodiments.

Further, in the embodiment described above, all the imaging pixels are formed as focus detection pixels, but the present invention is not limited to this, and the focus detection pixels may be arranged discretely. In this case, the periodic actuation control described above may be performed when acquiring the signal for focus detection.

Furthermore, in the above-described embodiments, explanations have been made using a digital camera with an interchangeable lens (so-called single-lens reflex camera), but the present invention is not limited to this, and the present invention may be applied to a digital camera with a fixed lens (so-called compact digital camera). Furthermore, although there is no particular mention of whether the focus detection operation is for a still image or a moving image, the present invention is not limited by the type of image to be shot.

Other Embodiments

Note that the present invention may be applied to a system made up of a plurality of devices, or to a device made up of one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-044725, filed Mar. 20, 2023 which is hereby incorporated by reference herein in its entirety.

What is claimed is:

1. An image capturing apparatus comprising:

an image sensor in which a plurality of pixels including focus detection pixels that output signals so as to be able to acquire a pair of focus detection signals having parallax based on light fluxes that have passed through mutually different pupil regions of an imaging optical system are arranged;

a movement control unit that moves incident positions of the light fluxes on the image sensor; and a focus detection unit that performs phase difference focus detection using the pair of focus detection signals, wherein the movement control unit periodically moves the incident positions a plurality of cycles during an exposure period for acquiring the pair of focus detection signals, and a point spread function obtained as a result of the movement in a first direction in which the phase difference is detected has three or more peaks, and wherein the focus detection unit is implemented by one or more processors, circuitry or a combination thereof.

2. The image capturing apparatus according to claim 1, wherein the movement control unit moves the incident positions in the first direction.

3. The image capturing apparatus according to claim 2, wherein the periodical movement of the incident positions includes movement with a first amplitude and movement with a second amplitude different from the first amplitude during the one vertical synchronization period.

4. The image capturing apparatus according to claim 3, wherein the first amplitude is larger than ½ of a distance between the plurality of pixels and smaller than the distance between the plurality of pixels.

5. The image capturing apparatus according to claim 2, wherein the movement control unit moves the incident positions so that loci of the incident positions with respect to time are a triangular wave.

6. The image capturing apparatus according to claim 5, wherein an amplitude of the triangular wave is the same as a distance between the focus detection pixels.

7. The image capturing apparatus according to claim 1, wherein the movement control unit moves the incident positions so as to form loci in which two circles are connected in the first direction during the exposure period for acquiring the pair of focus detection signals.

8. The image capturing apparatus according to claim 7, wherein the length of the two circles in the first direction is twice the distance between the focus detection pixels.

9. The image capturing apparatus according to claim 7, wherein the movement control unit moves the incident positions so as to form loci of a figure-eight shape in which two circles are connected in the first direction during the exposure period for acquiring the pair of focus detection signals.

10. The image capturing apparatus according to claim 1, wherein the movement control unit moves at least one of the image sensor and an image stabilization lens included in the imaging optical system on a plane orthogonal to an optical axis of the imaging optical system.

11. The image capturing apparatus according to claim 10, wherein the movement control unit moves the image sensor and the image stabilization lens included in the imaging optical system on the plane orthogonal to the optical axis of the imaging optical system, so as to move the incident positions of the light fluxes with mutually different amplitudes and periods.

12. The image capturing apparatus according to claim 1, wherein the movement control unit using different methods for moving the incident positions during the exposure period for acquiring the pair of focus detection signals and during recording an image.

13. The image capturing apparatus according to claim 1, the focus detection unit performs focus detection in the first direction and in the second direction that intersect the first direction.

14. A control method of an image capturing apparatus which comprises: an image sensor in which a plurality of pixels including focus detection pixels that output signals so as to be able to acquire a pair of focus detection signals having parallax to be used for phase difference focus detection based on light fluxes that have passed through mutually different pupil regions of an imaging optical system are arranged; and a movement control unit that moves incident positions of the light fluxes on the image sensor, the method comprising periodically moving the incident positions a plurality of cycles during an exposure period for acquiring the pair of focus detection signals, wherein a point spread function obtained as a result of the movement in a first direction in which the phase difference is detected has three or more peaks.

15. The control method according to claim 14, wherein the incident positions are moved in the first direction.

16. The control method according to claim 15, wherein the periodical movement of the incident positions includes movement with a first amplitude and movement with a second amplitude different from the first amplitude during the one vertical synchronization period.

17. The control method according to claim 15, wherein the incident positions are moved so that loci of the incident positions with respect to time are a triangular wave.

18. The control method according to claim 14, wherein the incident positions are moved so as to form loci in which two circles are connected in the first direction during the exposure period for acquiring the pair of focus detection signals.

19. The control method according to claim 18, wherein the length of the two circles in the first direction is twice the distance between the focus detection pixels.

* * * * *